US012319361B2

(12) United States Patent
Babymony et al.

(10) Patent No.: US 12,319,361 B2
(45) Date of Patent: Jun. 3, 2025

(54) SLIDING TAILGATE FOR A VEHICLE

(71) Applicants: Hyundai Motor Company, Seoul (KR); Kia Corporation, Seoul (KR)

(72) Inventors: Manikandan Babymony, Superior Township, MI (US); Jason J. Lilburn, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/174,744

(22) Filed: Feb. 27, 2023

(65) Prior Publication Data
US 2024/0286687 A1  Aug. 29, 2024

(51) Int. Cl.
*B62D 33/027* (2006.01)
*B62D 33/03* (2006.01)
*E05D 15/10* (2006.01)

(52) U.S. Cl.
CPC ......... *B62D 33/0273* (2013.01); *B62D 33/03* (2013.01); *E05D 15/1047* (2013.01); *E05D 2015/1055* (2013.01); *E05Y 2201/684* (2013.01); *E05Y 2800/102* (2013.01); *E05Y 2900/544* (2013.01)

(58) Field of Classification Search
CPC ....... B60J 5/10; B60J 5/12; B60J 5/102; B60J 5/103; B60J 5/104; B60J 5/125; E05D 15/582; E05D 2015/1055; E05D 2015/485; E05D 15/1047; B62D 33/0273; B62D 33/03; E06B 3/5081; E06B 3/5054
See application file for complete search history.

(56) References Cited

U.S. PATENT DOCUMENTS

| | | | | |
|---|---|---|---|---|
| 3,010,760 A * | 11/1961 | Trautmann | ............... | B60J 5/103 |
| | | | | 296/37.16 |
| 3,309,133 A * | 3/1967 | Butler | ........................ | B60J 5/12 |
| | | | | 296/51 |
| 3,912,326 A * | 10/1975 | Tass | .................... | B62D 33/0273 |
| | | | | 49/159 |
| 5,685,594 A * | 11/1997 | Harper | ............... | B62D 33/0273 |
| | | | | 296/57.1 |
| 6,007,139 A * | 12/1999 | Shave | ........................ | B60J 5/12 |
| | | | | 296/146.8 |
| 9,718,331 B2 * | 8/2017 | Maruyama | .............. | E05B 83/40 |
| 9,988,103 B1 * | 6/2018 | Mouch | ............... | B62D 33/0273 |
| 10,358,854 B1 * | 7/2019 | Guygaew | ............... | E05D 15/22 |
| 10,480,233 B2 * | 11/2019 | Vega | .................... | E05D 15/1081 |
| 11,214,318 B1 * | 1/2022 | Parker | ................... | B62D 33/037 |
| 11,607,935 B2 * | 3/2023 | Lee | ........................... | B60J 5/105 |

(Continued)

FOREIGN PATENT DOCUMENTS

| | | | | | |
|---|---|---|---|---|---|
| FR | 2818591 | A1 * | 6/2002 | ............. | B60J 5/105 |
| FR | 2875442 | A1 * | 3/2006 | ............. | B60R 5/041 |
| KR | 20150107272 | A * | 3/2014 | ............. | B60J 5/108 |

*Primary Examiner* — Daniel P Cahn
*Assistant Examiner* — Patrick B. Ponciano
(74) *Attorney, Agent, or Firm* — Fox Rothschild LLP (57) ABSTRACT

A tailgate opening system includes a first panel and a second panel forming a tailgate of the vehicle. The vehicle has a first vehicle sidewall and a second vehicle sidewall. A first hinge is coupled between the first panel and the second panel. The first hinge is configured to rotate the second panel toward the first panel, moving the second panel towards the first vehicle sidewall for opening the tailgate sideways.

13 Claims, 12 Drawing Sheets

(56) References Cited

U.S. PATENT DOCUMENTS

| | | | |
|---|---|---|---|
| 2006/0197357 A1* | 9/2006 | Catania | E05D 15/58 |
| | | | 296/155 |
| 2021/0138880 A1* | 5/2021 | Lee | E05B 83/38 |
| 2021/0245818 A1* | 8/2021 | Van Norman | B62D 33/0273 |
| 2022/0161870 A1* | 5/2022 | Horner | B60J 5/108 |

* cited by examiner

SLIDING TAILGATE FOR A VEHICLE

TECHNICAL FIELD

The present disclosure relates generally to vehicles, and more particularly, to a sliding tailgate for a vehicle.

BACKGROUND

Truck beds carry cargo of various weights and sizes. Tailgates are a common feature on trucks that make loading and unloading the truck bed easier. Tailgates fold outwards from the truck and often align with the floor of the truck in a horizontal configuration. But this outward folding limits access to the bed of the truck especially near the cabin area. Consequently, reaching cargo is more difficult with the tailgate folded down. More worrisome, heavier objects may be placed closer to the cabin area, which results in increased difficulty in these harder-to-reach objects. Currently, consumers reach over the side of the pickup truck sidewalls or climb up in to the truck bed to access the cargo and harder-to-reach objects.

SUMMARY

The present disclosure provides methods, systems, articles of manufacture that include a folding tailgate.

In particular aspects, a tailgate is provided that can be opened or released from an upright closed position to both 1) drop down (where the tailgate or a portion thereof is moved downwardly from a vertical position) opening by dropping down from a closed vertical position and 2) lateral opening by laterally moving at least a portion of the tailgate. A user can optionally elect which opening or position to deploy the tailgate or portion thereof. In certain preferred aspects, the tailgate may be opened laterally by sliding a tailgate portion laterally, such as sliding a tailgate portion or panel laterally to be positioned adjacent (e.g. either in front of or behind) another tailgate portion.

The lateral opening of the tailgate can provide move compact access to the vehicle tail bed without an outwardly extending tailgate interposed by a person seeking access and the tail bed. That is, a person (e.g. vehicle passenger) can reach items in the truck bed having to reach across tailgate to access the truck bed.

In certain preferred aspects, the tailgate comprises two or more separate panels or portions. In certain aspects, the tailgate comprises two separate panels or portions. Preferably at least one panel can move (e.g. slide) laterally to a position in front or behind an adjacent tailgate panel or portion. Preferably at least one of the plurality of tailgate panels can drop down to open from a vertical position.

In certain preferred aspects, the tailgate has a U frame with hinges at lower end. Suitably the hinges can enable the tailgate to dropdown from a vertical to a horizontal position. Suitably the tailgate further comprises latches or other fastening means.

In one aspect, there is provided a tailgate opening system including a first panel and a second panel forming a tailgate of the vehicle. The vehicle has a first vehicle sidewall and a second vehicle sidewall. A first hinge is coupled between the first panel and the second panel. The first hinge is configured to rotate the second panel toward the first panel, moving the second panel towards the first vehicle sidewall for opening the tailgate sideways.

In some variations, the first panel and the second panel are in an upright orientation as the first hinge rotates the second panel toward the first panel. Further, the first panel and the second panel are releasably attached to a first vehicle sidewall and a second vehicle sidewall, respectively. Further, the first panel is configured to be selectively coupled to a second hinge at the first vehicle sidewall. Additionally, the second hinge is configured to rotate the first panel away from a vehicle bed as the first hinge rotates the second panel toward the first panel. In some variations, the second hinge is configured to rotate the first panel and the second panel as the first panel and the second panel are aligned with each other.

In some variations, the tailgate opening system further comprises a track extending along an edge proximate to a vehicle bed, a pivot hinge with a sliding mechanism, the sliding mechanism coupled to the track, and a linkage disposed at a bottom end of the second panel, the linkage configured to selectively couple to the pivot hinge. The linkage is disposed proximate to an end of the second panel farthest from the first panel. Further, the linkage of the second panel is configured to move with the pivot hinge and sliding mechanism across the track to move the second panel towards the first vehicle sidewall. Additionally, the linkage further includes a pin configured to be selectively inserted into an aperture at the pivot hinge. In some variations, wherein the track extends along a cross member between the first vehicle sidewall and the second vehicle sidewall, the cross member disposed below the vehicle bed. In some variations, the linkage of the second panel is configured to detach from the pivot hinge to move the second panel away from the vehicle bed.

In some variations, the tailgate opening system further comprises a latch configured to fold the first panel and the second panel down from a vertical orientation to a horizontal orientation in response to being manipulated, wherein the first panel and the second panel folds out over an axis proximate to a bottom edge of the first panel and the second panel. Additionally, the second panel is selectively coupled to a retractable cable to support the first panel and the second panel in the horizontal orientation, the retractable cable attached to the first vehicle sidewall. The retractable cable is selectively coupled to the second panel with a retractable pin.

In another aspect, there is a tailgate including a first panel and a second panel forming the tailgate for the vehicle. The vehicle may have a first vehicle sidewall and a second vehicle sidewall. The tailgate includes a first hinge coupled between the first panel and the second panel. The first hinge is configured to rotate the second panel toward the first panel, moving the second panel towards the first vehicle sidewall for opening the tailgate sideways.

In some variations, the first panel and the second panel are in an upright orientation as the first hinge rotates the second panel toward the first panel. Further, the first panel and the second panel are releasably attached to the first vehicle sidewall and the second vehicle sidewall, respectively. Additionally, the first panel is configured to be selectively coupled to a second hinge at the first vehicle sidewall. Further, the second hinge is configured to rotate the first panel away from a vehicle bed as the first hinge rotates the second panel toward the first panel. Additionally, the second hinge is configured to rotate the first panel and the second panel as the first panel and the second panel are aligned with each other. Further, the tailgate may include a linkage disposed at a bottom end of the second panel, the linkage configured to selectively couple to a pivot hinge on the vehicle.

In further aspects, vehicles are provided (include trucks and pickup trucks) that comprise a tailgate as disclosed herein.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 2A and 2B depict examples of preferred tailgate opening systems. In FIG. 2A, The tailgate is shown in a closed configuration with both tailgate panels positioned in vertical non-overlapping positions. In FIG. 2B, the tailgate is shown in one open configuration one tailgate panel laterally positioned to at least partially overlap an adjacent tailgate panel.

FIGS. 3A and 3B depict examples of preferred tailgate opening systems in cut-away views. In FIG. 3A, The tailgate is shown in a closed configuration with both tailgate panels positioned in vertical non-overlapping positions. In FIG. 3B, the tailgate is shown in one open configuration one tailgate panel laterally positioned to at least partially overlap an adjacent tailgate panel.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, trucks including pickup trucks, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to the present disclosure, a tailgate of a truck may include two side-by-side panels that are connected with a hinge. The hinge allows the two panels to fold together at the sides. At least one of the panels may slide sideways such that the tailgate slides to one side of the truck. Sliding the tailgate panels to one side of the truck enhances access to the truck bed. The tailgate may slide using a pivot hinge and linkages at the bottom of the tailgate. The pivot hinge may slide along a track running from one sidewall to the other sidewall. In comparison to single-panel tailgates that swing open, the folding panels may have a smaller footprint and may have a smaller range of motion. The folding panels accommodate limited spaces behind the truck for loading and unloading cargo.

The tailgate may include a hinge in the middle to fold two panels together. At least one of the panels may slide sideways as the two panels are folded together. The sliding assembly may include a pivot hinge, a sliding mechanism, and a sliding track. The sliding track may attach to a cross-member of the truck below the floor. The sliding track may be similar to a sliding track found on a van door. A sliding mechanism may be inserted into the track, which enables at least one of the panels to slide sideways as the two panels are folded together. The pivot hinge may be coupled to the sliding mechanism via linkages. A panel may be disconnected from the truck by detaching the linkages from the sliding mechanism. Disconnecting the panel may provide enhanced access to the truck bed.

The tailgate may fold down similar to a conventional tailgate on a truck. The truck may fold down about an axis near the bottom edge of the tailgate similar to conventional tailgates. The tailgate may include a latch to fold down the tailgate from a closed position similar to a conventional tailgate on a truck. The folding tailgate may have a pair of cables to support conventional tailgate opening. The cables may extend from the sides of the tailgate. The sides of the tailgate may include a retractable pin to allow the cables to detach from the tailgate. Detaching the cables from the tailgate may enable the tailgate to fold and open sideways. The cables may be retractable.

The methods, systems, apparatuses, and non-transitory storage mediums described herein fold a tailgate to the side to expand access to the truck bed. The various embodiments also enable the detachment of a panel of the tailgate for increased access to the truck bed.

Figure 1:
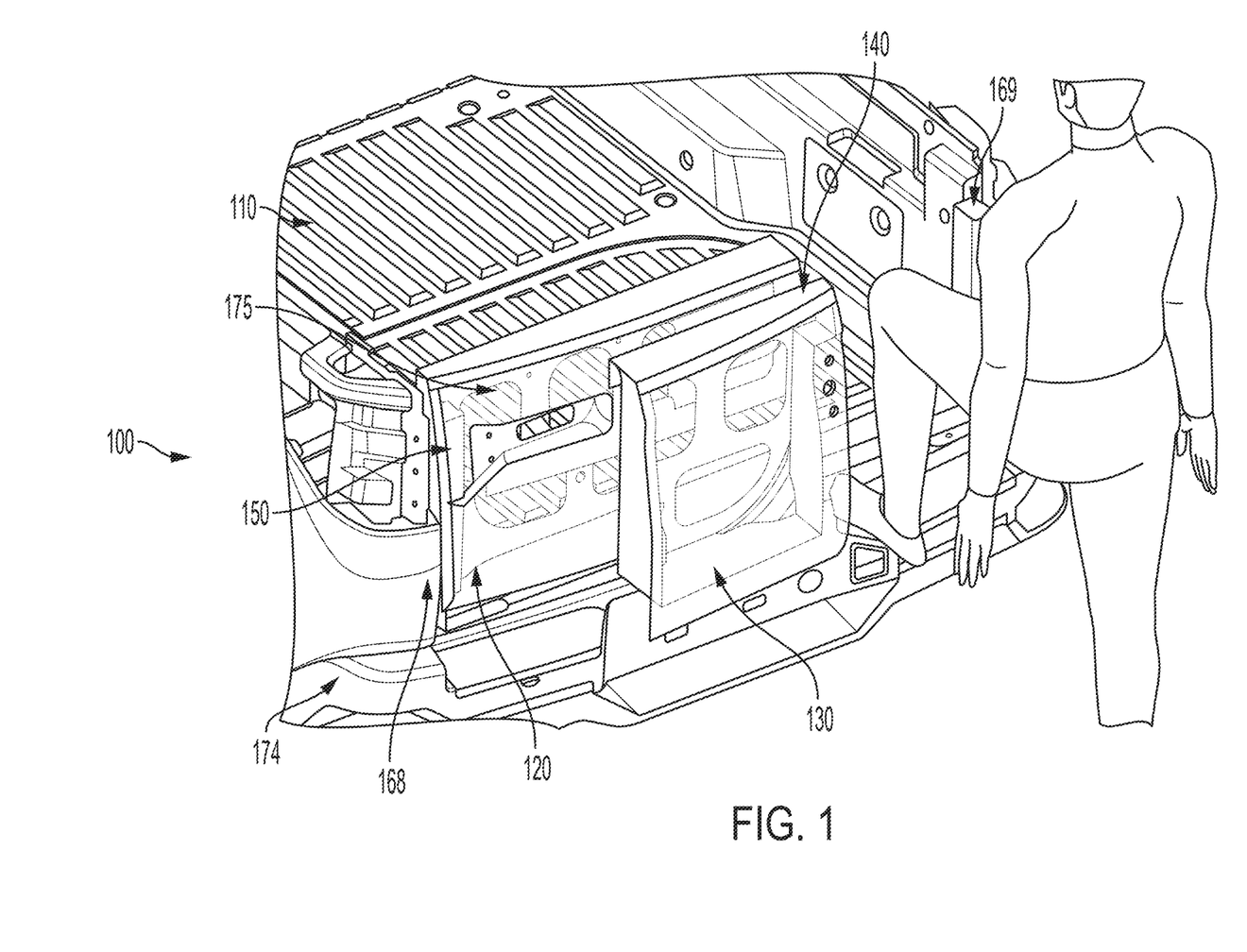
FIG. 1 depicts an example of a diagram representative of a tailgate and opening system in an unfolded or closed position.

FIG. 1 depicts an example of a diagram representative of a tailgate opening system 100 in an unfolded position at a vehicle 110. The tailgate opening system may include a left tailgate panel 120, a right tailgate panel 130, a first hinge connecting 140 the left tailgate panel and the right tailgate panel, a first latch for folding down the tailgate, and a second latch for opening the tailgate sideways, such as depicted in FIG. 1 where right tailgate panel 130 is extended in an open position toward left tailgate panel 120.

Figure 2A:
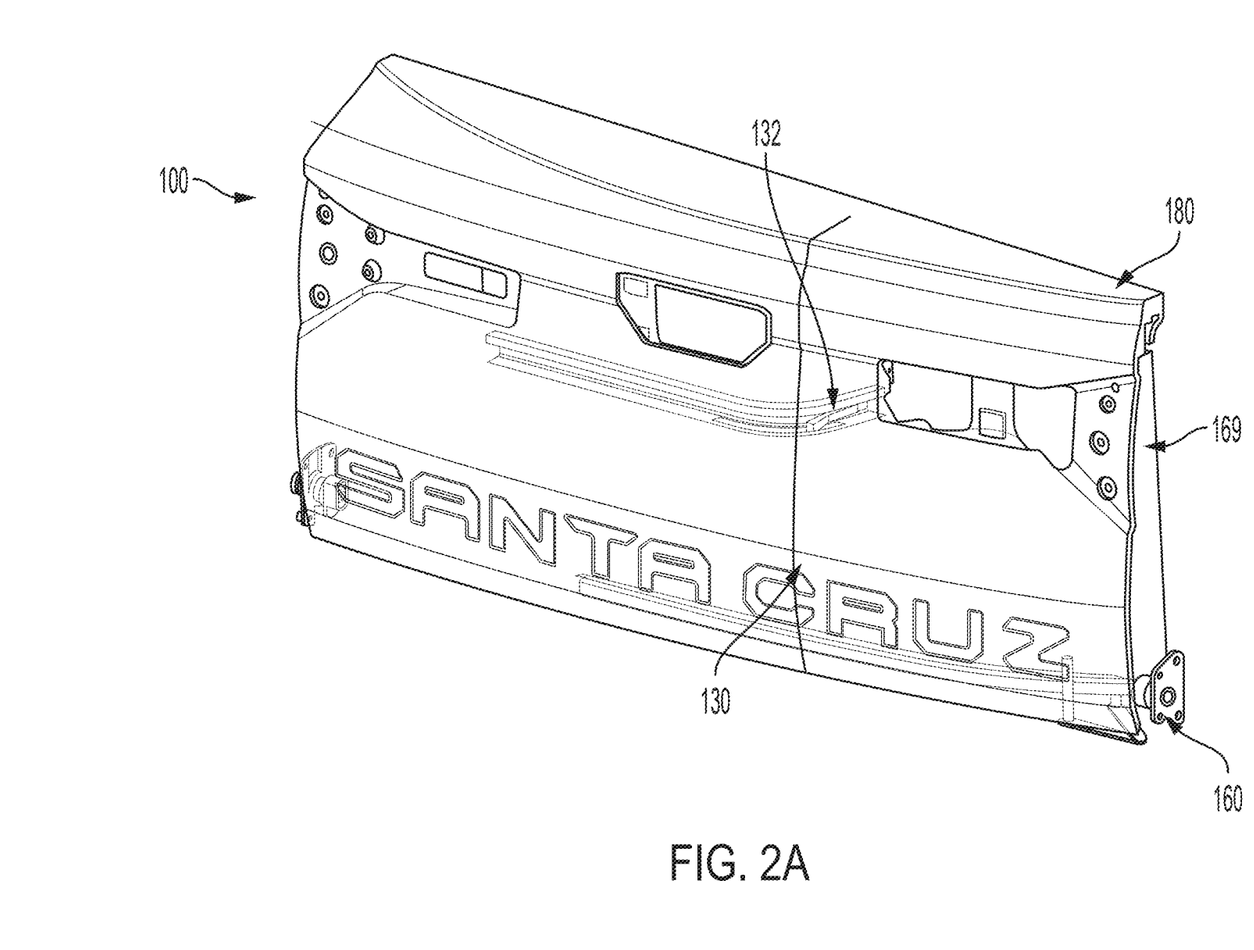

The tailgate opening system 100 may include the left tailgate panel 120 and the right tailgate panel 130 connected by the first hinge 140. The left tailgate panel and the right tailgate panel may be situated in an upright position as depicted in FIGS. 1 and 2A. In the upright position, the left tailgate panel and the right tailgate panel secure the cargo in the truck as is depicted in FIG. 2A. The left tailgate panel and the right tailgate panel may form a back wall for the truck to prevent the cargo from sliding out the back of the truck. The left tailgate panel and the right tailgate panel may be aligned. The alignment of the left tailgate panel and the right tailgate panel may make the tailgate appear to be a single unit as generally depicted in FIG. 2A.

The tailgate opening system may include a first latch for folding down the tailgate 180. The first latch suitably may be positioned in the middle of the tailgate. The first latch may manipulated in a similar fashion to a conventional tailgate where the tailgate may be folded down over an axis by pulling on the first latch. Similarly, the tailgate may be pushed up to an upright position and remain in the upright position by latching the tailgate to the vehicle sidewalls.

The tailgate opening system may include a second latch 160 for opening the tailgate sideways. The second latch 160 may be located at the right tailgate panel. The second latch may be located in a bottom right-hand corner of the right tailgate panel. Alternatively, the second latch may be located at the left tailgate panel. The second latch may be located in a bottom left-hand corner of the left tailgate panel. The second latch may be enable the tailgate to be opened from side-to-side.

Figure 2B:
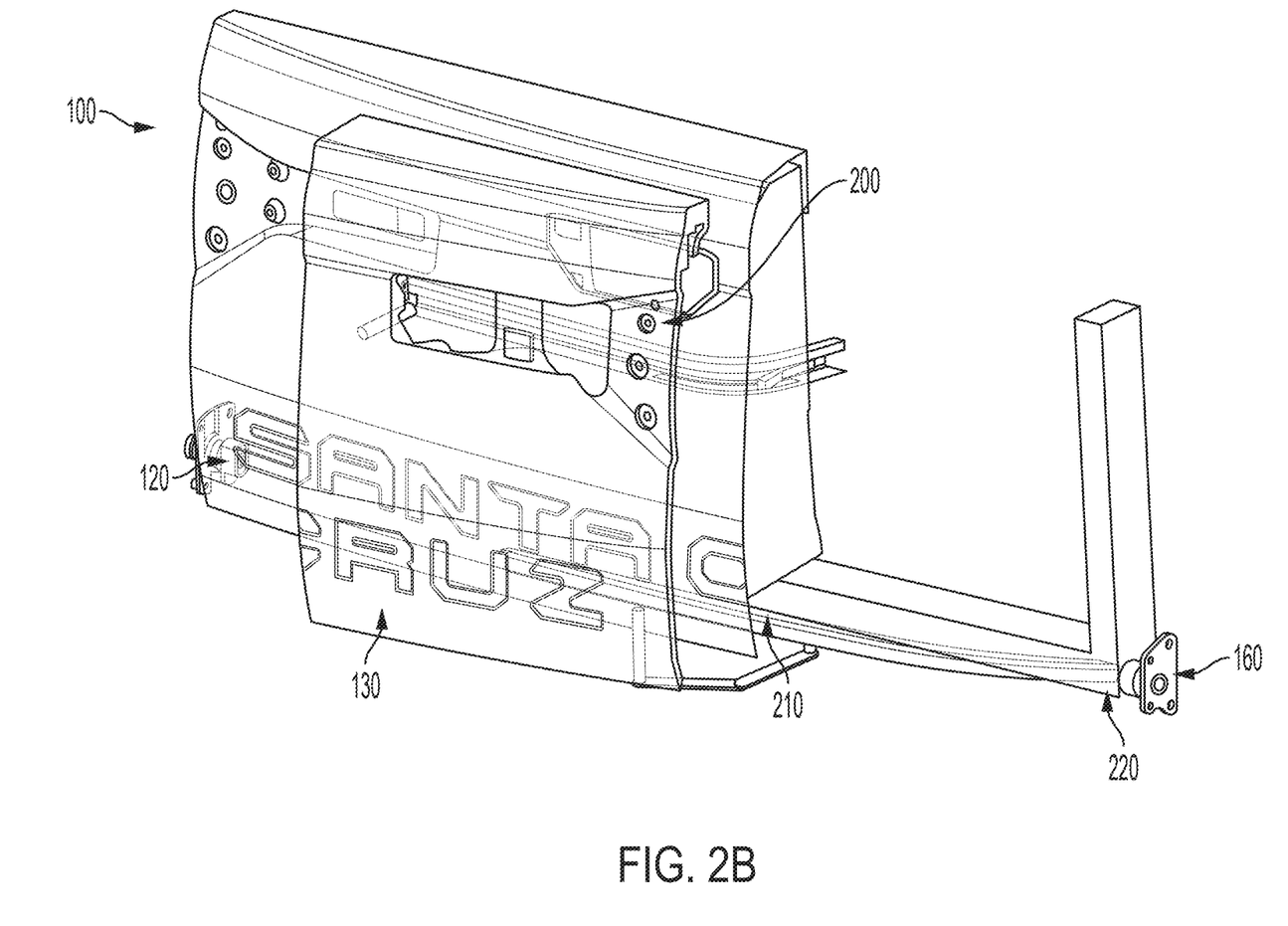

FIG. 2B depicts an example of drawing representative of a tailgate opening system in an unfolded position at a vehicle. The tailgate opening system may include a left tailgate panel 120, a right tailgate panel 130, a first hinge 200 connecting the left tailgate panel and the right tailgate panel, a first latch 210 for folding down the tailgate, and a second latch 220 for opening the tailgate sideways.

The tailgate may be situated above a back bumper 174 of a vehicle 110 as generally shown in FIG. 1. The tailgate may include a lamp 175 on the left tailgate panel 120 and the right tailgate panel 130. In some embodiments, a tailgate may be formed by the left tailgate panel 120 and the right tailgate panel 130. The left tailgate panel 120 and the right tailgate panel 130 may be situated between the vehicle sidewalls. The left tailgate panel 120 may be attached to a first vehicle sidewall 168 and the right tailgate panel 130 may be attached to a second vehicle sidewall 169. The first vehicle sidewall 168 may oppose the second vehicle sidewall 169. The first panel 120 and the second panel 130 may be releasably attached to a left sidewall 168 and a right sidewall 169, respectively. A first hinge 140 may couple between the left tailgate panel 120 and the right tailgate panel 130. The first hinge 140 may be configured to rotate the right tailgate panel 130 toward the left tailgate panel 120, thereby moving the right tailgate panel 130 towards the first vehicle sidewall 168 for opening the tailgate sideways.

In some embodiments, the left tailgate panel 120 and the right tailgate panel 130 may be in an upright orientation as the first hinge rotates the right tailgate panel toward the left tailgate panel. The left tailgate panel 120 may be configured to selectively couple to a second hinge at the first vehicle sidewall. The second hinge may be configured to rotate the left tailgate panel away from the vehicle bed as the first hinge rotates the right tailgate panel toward the left tailgate panel. In some embodiments, the second hinge may be configured to rotate an aligned first panel and the second panel while the first hinge remains immobile.

FIG. 2B depicts an example of drawing representative of a tailgate opening system in a partially folded position at a vehicle. The tailgate may transition between the closed position and the open position by sliding the left tailgate panel and the right tailgate panel together. The tailgate may transition between the unfolded position and the folded position by sliding the left tailgate panel and the right tailgate panel together.

To move the tailgate from the closed position to the open position, the second latch may be used to open the tailgate sideways. Pulling the tailgate latch may release a retractable pin attached to the tailgate latch. The first hinge may begin to rotate the right tailgate panel towards the left tailgate panel as the right tailgate panel slides across the sliding track 210 towards the left sidewall. The second hinge may be configured to rotate the first panel away from a vehicle bed as the right tailgate panel slides across the sliding track towards the left sidewall. The right tailgate panel may continue to move towards the left until the back side of the right tailgate panel faces the back side of the left tailgate panel. The folded tailgate may be positioned at the left sidewall. Additionally, and/or alternatively, the left side panel may fold towards the right side panel such that the left side panel and the right side panel are folded together at the opposite sidewall (i.e., the right sidewall).

To move the tailgate from the closed position to the open position, the left tailgate panel and the right tailgate panel may be unfolded to form the back wall of the truck. The user may be required to pull the second latch to unfold the right tailgate panel from the left tailgate panel. The right tailgate panel may be pulled towards the right sidewall. As the right tailgate panel moves towards the right sidewall, the backside of the right tailgate panel may be separated from the backside of the left tailgate panel. As the right tailgate panel moves towards the right sidewall, the second hinge may be configured to rotate the first panel toward the vehicle bed. As the right tailgate panel moves towards the right sidewall, the first hinge may be configured to rotate the right tailgate panel away from the left tailgate panel. Additionally, and/or alternatively, the left side panel may fold away from the right side panel as the left tailgate panel moves towards the left sidewall.

Figure 3A:
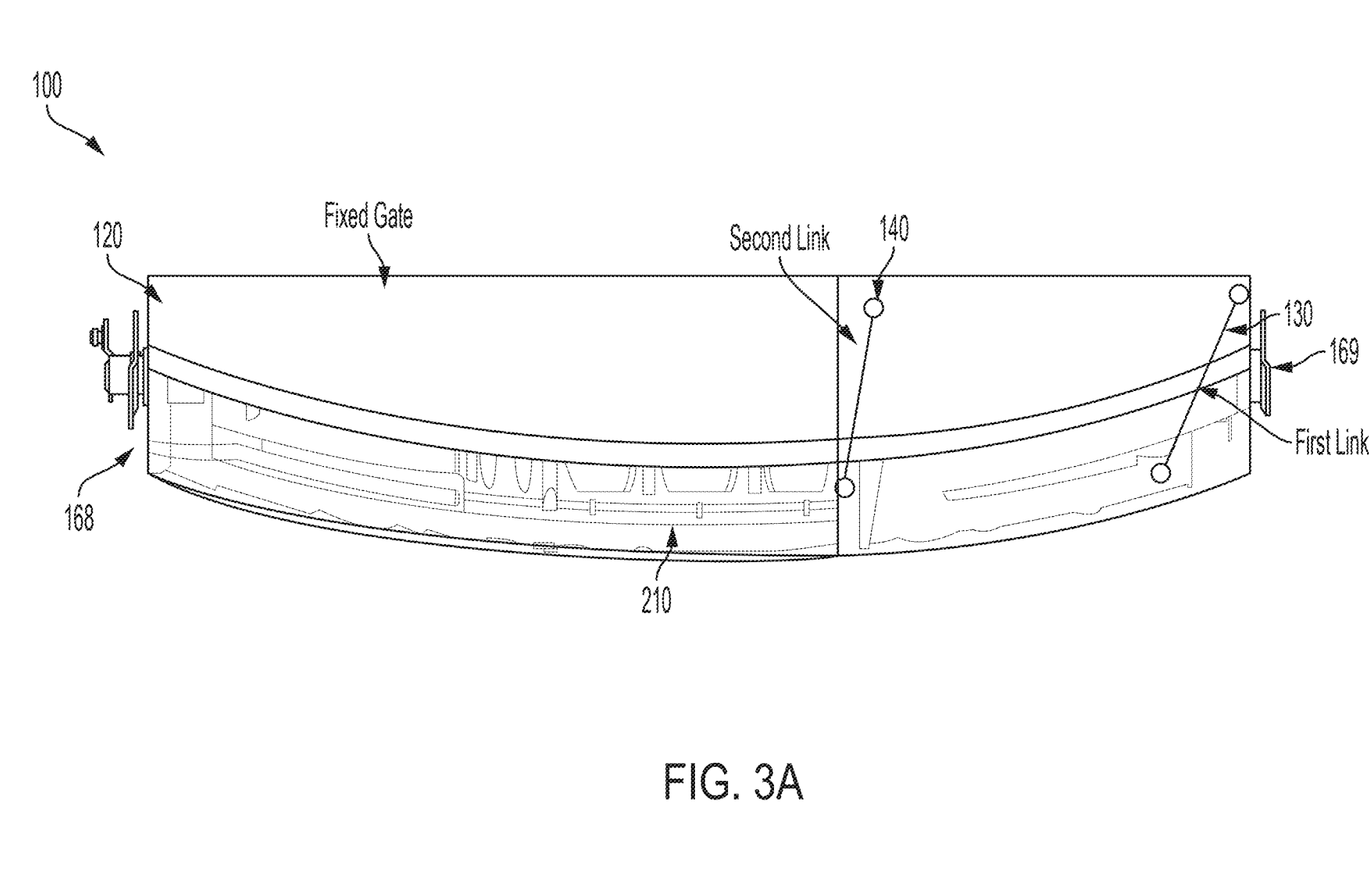

FIG. 3A depicts an example of a diagram representative of a tailgate opening system 100 in a folded position at a vehicle. The tailgate opening system 100 may include a left tailgate panel 120, a right tailgate panel 130, a first hinge or other connector unit 140 connecting the left tailgate panel and the right tailgate panel, a left sidewall 168 and a right sidewall 169, a first latch for folding down the tailgate, a second latch for opening the tailgate sideways, and a second hinge connected to the left tailgate panel and the left sidewall. In comparison to single-panel tailgates that swing open, the folding panels may have a smaller footprint and may have a smaller range of motion. The folding panels may accommodate limited spaces behind the truck for loading and unloading cargo.

The tailgate opening system may include the left tailgate panel and the right tailgate panel connected by the first hinge. The left tailgate panel and the right tailgate panel may be situated in an upright position. The first hinge may allow the left tailgate panel and the right tailgate panel to fold together sideways in the upright position. At least one of the panels may slide sideways such that the tailgate slides to one side of the truck as it folds. Sliding the left tailgate panel and the right tailgate panel to one side of the truck may enhance access to the truck bed. Sliding the left tailgate panel and the right tailgate panel may occur while the left tailgate panel and the right tailgate panel are in an upright position.

The tailgate opening system may include a pivot hinge, a sliding mechanism, and a sliding track 220. The sliding track may attach to a cross-member of the truck extending from the left sidewall to the right sidewall. The cross-member may be below the floor of the truck. The sliding track may be similar to a sliding track found on a van door.

The tailgate opening system may include a sliding mechanism. The sliding mechanism may be inserted into the sliding track, which enables at least one of the panels to slide sideways as the two panels are folded together. The sliding mechanism may run along a sliding track at a cross-member of the truck extending from the left sidewall to the right sidewall.

The right tailgate panel may include a pivot hinge. The right tailgate panel may slide using a pivot hinge connected to the sliding mechanism via linkages. The left tailgate panel may be coupled to a second hinge at the first vehicle sidewall. The second hinge may be configured to rotate the left tailgate panel away from the vehicle bed as the first hinge rotates the right tailgate panel toward the left tailgate panel. The first hinge may rotate the right tailgate panel toward the left tailgate panel as the right tailgate panel slides along the sliding track via the sliding mechanism. The panel may be disconnected from the truck by detaching the linkages from the sliding mechanism. Disconnecting the panel may provide enhanced access to the truck bed.

Figure 3B:
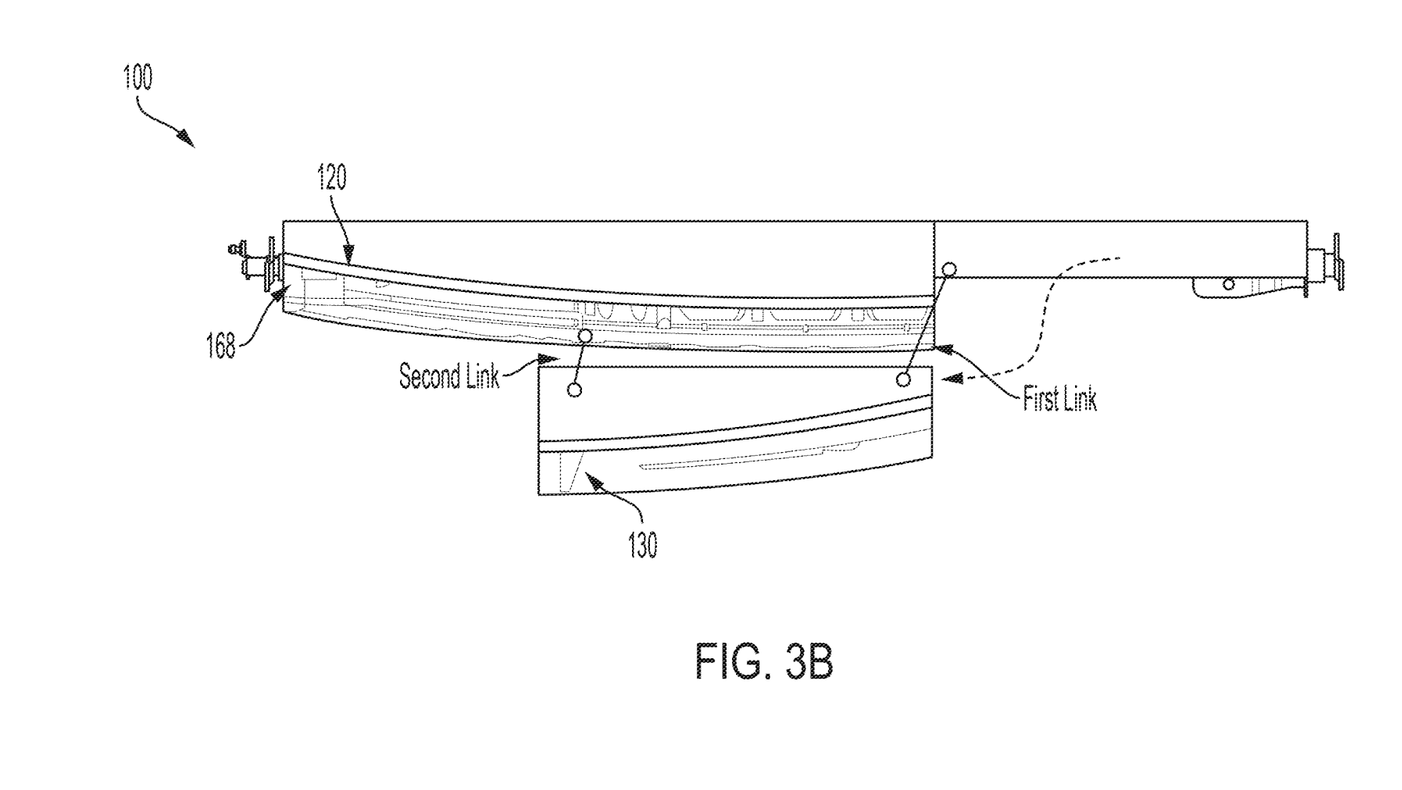

FIG. 3B depicts an example of drawing representative of a tailgate opening system in a folded position in a vehicle. In comparison to single-panel tailgates that swing open, the folding panels 120 and 130 may have a smaller footprint and may have a smaller range of motion. The folding panels may accommodate limited spaces behind the truck for loading and unloading cargo.

In some embodiments, the tailgate opening system may include the left tailgate panel 120 and the right tailgate pane 1301 to form a tailgate of the vehicle. The left tailgate panel and the right tailgate panel may be situated between the vehicle sidewalls. The first panel and the second panel may be releasably attached to a left sidewall and a right sidewall, respectively. A first hinge may couple between the left tailgate panel and the right tailgate panel. The first hinge may be configured to rotate the right tailgate panel toward the left tailgate panel thereby moving the right tailgate panel towards the left vehicle sidewall for opening the tailgate sideways.

In some embodiments, the left tailgate panel and the right tailgate panel may be in an upright orientation as the first hinge rotates the right tailgate panel toward the left tailgate panel. The left tailgate panel may be configured to selectively couple to a second hinge at the first vehicle sidewall. The second hinge may be configured to rotate the left tailgate panel away from the vehicle bed as the first hinge rotates the right tailgate panel toward the left tailgate panel. In some embodiments, the second hinge may be configured to rotate an aligned first panel and the second panel while the first hinge remains immobile.

Figure 4:
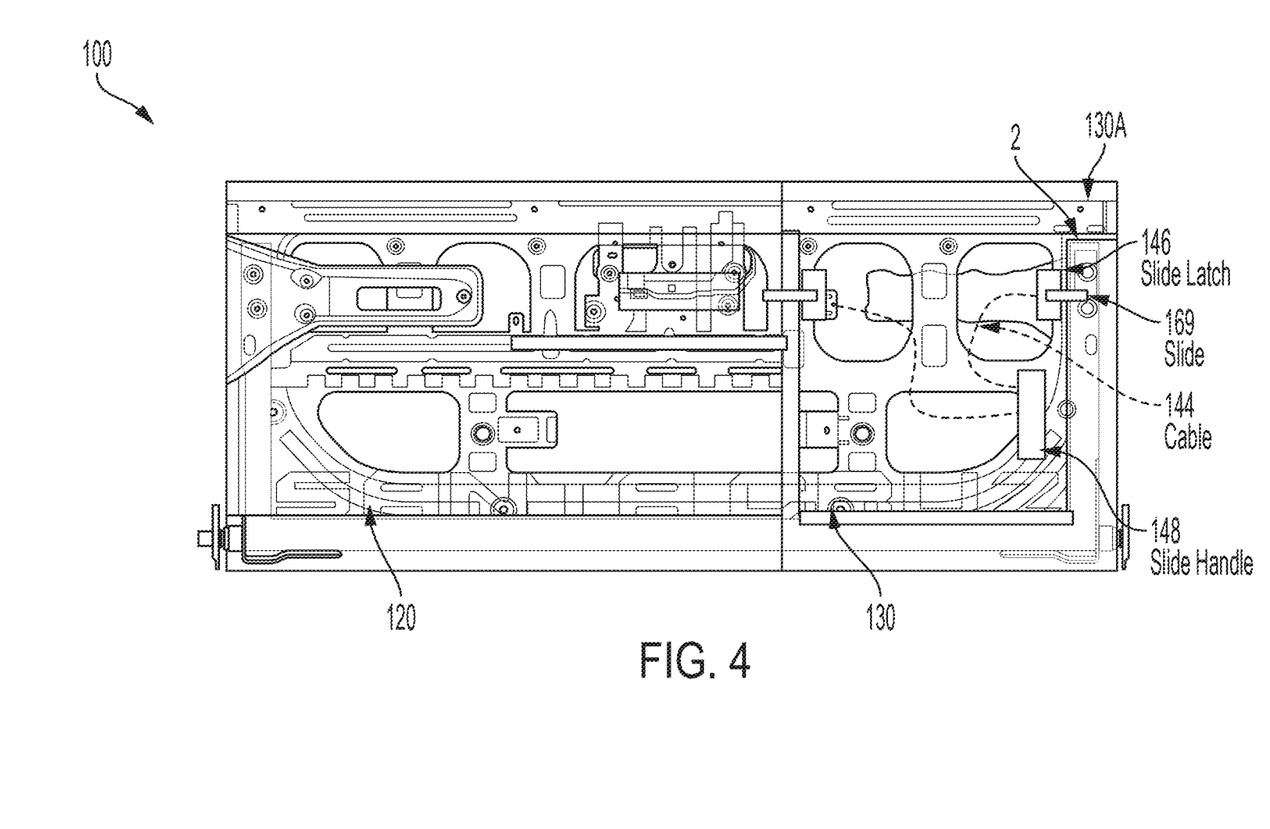
FIG. 4 depicts a preferred tailgates and opening system.

FIG. 4 depicts an example of a diagram representative of a tailgate opening system 100 in a closed or vertical configuration at a vehicle. Similar to conventional tailgates, the folding tailgate may fold down to allow access to the truck bed. The detachable cable system may enable the folding tailgate to fold out and down and to also open sideways.

The left tailgate panel 120 and the right tailgate panel 130 may fold down and away from the truck bed. The left tailgate panel and the right tailgate panel may fold down about an axis near the bottom edge of the truck floor. The left tailgate panel or the right tailgate panel may include a latch to fold down the tailgate from a closed, upright position to a horizontal position away from the front of the truck. When the left tailgate panel and the right tailgate panel are in the horizontal position extending away from the front of the truck, the left tailgate panel and the right tailgate panel may be support by cables. The cables may be attached to the sidewalls of the truck. The cables may be retractable. In at least one embodiment, the retractable cable retracts inside the sidewall of the vehicle while the tailgate is in an upright position.

The folding tailgate may have one or more (including a pair) of cables to support conventional (downward) tailgate opening. Slide cable 144 is depicted in FIG. 4 and may suitably be actuated via slide latch 146 and slide handle 148. The one or more cables suitably may extend from the sides of the tailgate. The sides of the tailgate may include a retractable pin to allow the cables to detach from the tailgate. Detaching the one or more cables from the tailgate may enable the tailgate to fold and open sideways. The cables suitably may be retractable.

The left tailgate panel or the right tailgate panel may include a recess. The recess may be configured to release a cable end. The cable end may be released from the recess. The cable end may include an aperture. The recess may also include a retractable pin configured to be selectively removed from the aperture of the cable end. The retractable pin may be selectively removed from the aperture at the cable end. When the retractable pin is removed from the aperture, the cable may be detached from the tailgate. Detaching the retractable pin from the aperture may enable the tailgate to open sideways.

In FIG. 4, a preferred configuration is depicted where right tailgate panel (or sliding panel) 130 extends in portion 130A beyond and/or over sidewall 169, suitably providing a flush or even surface mating the distal vertical face of sidewall 169.

Figure 5:
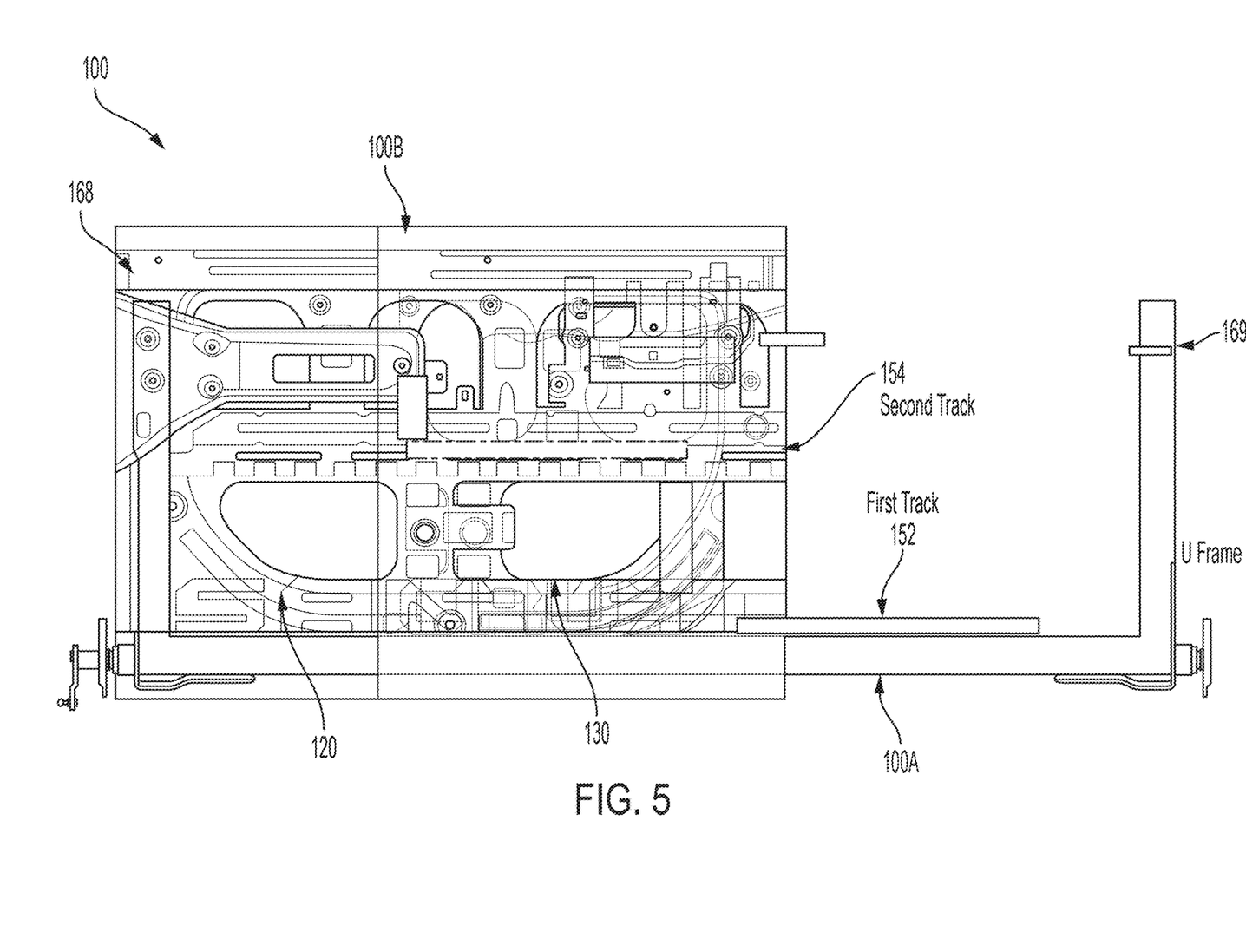
FIG. 5 depicts an example of drawing representative of a tailgate opening system showing multiple panels.

FIG. 5 depicts a preferred system where multiple tracks are utilized to laterally open panel 130. In the depicted configuration, first track 152 is suitably positioned along a bottom portion 100A of system 100 and second track 154 is position 120, suitably above bottom portion 100A. In certain embodiments, second track 154 will not be positioned along system top 100B, but in a middle region between portions 100A and 100B as generally depicted in FIG. 5.

In certain embodiments, a single track may be utilized to laterally extend sliding panel 130. In certain embodiments, more than two tracks (such as 3 or more) may be utilized to laterally extend sliding panel 130.

Figure 6:
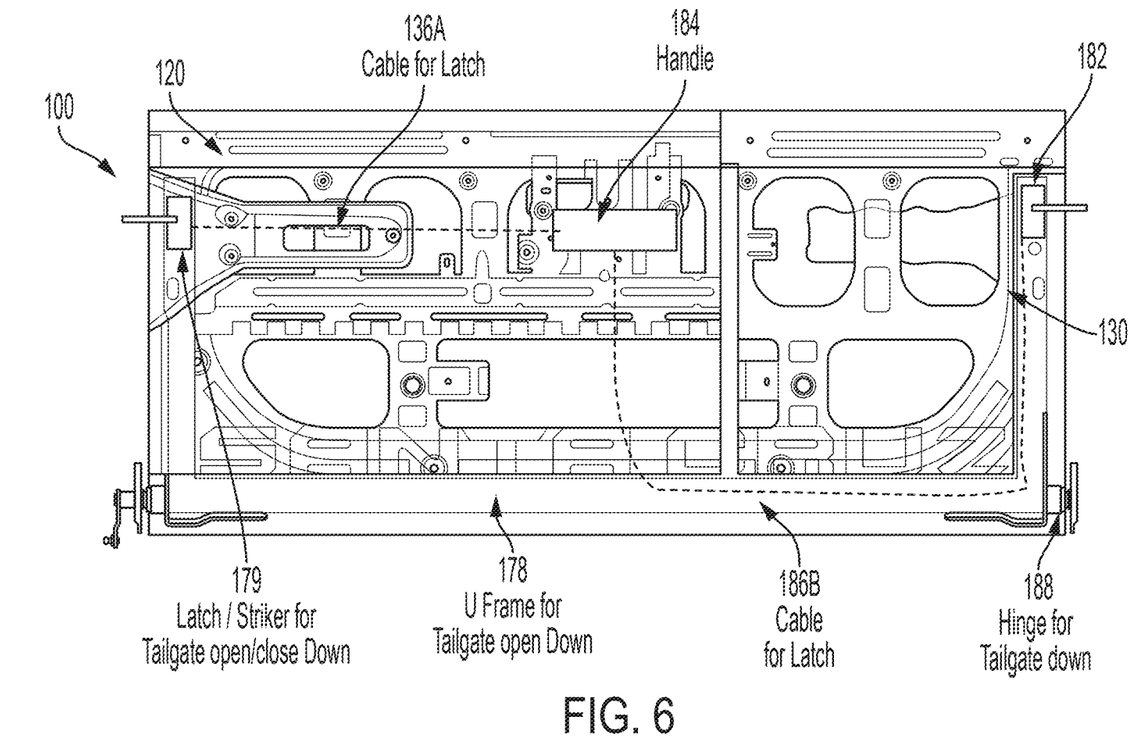
FIG. 6 depicts an example of a diagram representative of the sliding track, sliding mechanism, and pivot hinge at the bottom of the tailgate.

FIG. 6 depicts an example of a diagram representative of the sliding track, sliding mechanism, and pivot hinge at the bottom of the tailgate. A sliding assembly may include a pivot hinge, a sliding mechanism, and a sliding track. Disconnecting the panel may provide enhanced access to the truck bed.

As shown in FIG. 6, system 100 includes panels 120, 130 and frame unit 178 which suitably may be a U-frame and engagement units 179, 182 which suitably may be a latch/striker unit that can facilitate or enable opening the panels and tailgate to a down position and then return to a closed engaged position with panels 120, 130 in a vertical position. The frame unit 178 can serve to securely engage and support one or both of panels 120, 130 in a down position (e.g. where one or both of panels 120, 130 are substantially parallel to a ground plane). Handle 184 can be engaged by a user to release a vehicle panel to a down position, e.g. handle 184 can engage cable 136A which can engage or disengage latch 179 and/or 182. System 100 also suitably may include hinge 188 to facilitate movement of one or more panels 120, 130 to a lowered position or upward pivoting to return to a closed position.

A sliding track may attach to a cross-member of the truck extending from the left sidewall to the right sidewall. The cross member may be below the floor of the truck. The sliding track may be similar to a sliding track found on a van door. For example, the sliding track may be an enclosed rectangular rail with an aperture on the top face. The enclosed rectangular rail may be configured to receive the sliding mechanism. The sliding mechanism may interface with the linkages or the pivot hinge through the aperture on the top face.

The sliding assembly may include a sliding mechanism. The sliding mechanism may be inserted into the sliding track, which enables at least one of the panels to slide sideways as the two panels are folded together in an upright position. The sliding mechanism may run along a sliding track at a cross member of the truck extending from the left sidewall to the right sidewall. The sliding mechanism may include a wheel for smooth movement across the sliding track. The sliding mechanism may include a hole, pin, or a fastener to couple with the pivot hinge.

The sliding assembly may include a pivot hinge. The pivot hinge may be located at the right tailgate panel or the left tailgate panel. The pivot hinge may be positioned proximate to an end of the right tailgate panel farthest from the left tailgate panel. Additionally, and/or alternatively, the pivot hinge may be positioned proximate to an end of the left tailgate panel farthest from the right tailgate panel. The pivot hinge may slide with the sliding mechanism via linkages. The pivot hinge may be configured to rotate as the sliding mechanism moves along the sliding track. In turn, the pivot hinge may be configured to rotate as the right tailgate panel or the left tailgate panel slides along the sliding track. The pivot hinge may be configured to disconnect from the linkages and the sliding mechanism. For example, the pivot hinge may disconnect from the sliding mechanism by removing a bolt or a fastener from the linkages and an aperture in the pivot hinge. The linkage of the second panel may be configured to move with the pivot hinge and sliding mechanism across the track to fold the panels together.

In some embodiments, the tailgate opening system may further comprise a track extending along an edge proximate to a vehicle bed. The tailgate opening system may further comprise a pivot hinge with a sliding mechanism, the sliding mechanism coupled to the track. The tailgate opening system may further comprise a linkage disposed at a bottom end of the second panel, the linkage configured to selectively couple to the pivot hinge. The linkage may be disposed proximate to an end of the second panel farthest from the first panel.

The linkage of the second panel may be configured to move with the pivot hinge and sliding mechanism across the track to move the second panel towards the first vehicle sidewall. The linkage may further include a pin configured to be selectively inserted into an aperture at the pivot hinge.

Figure 7:
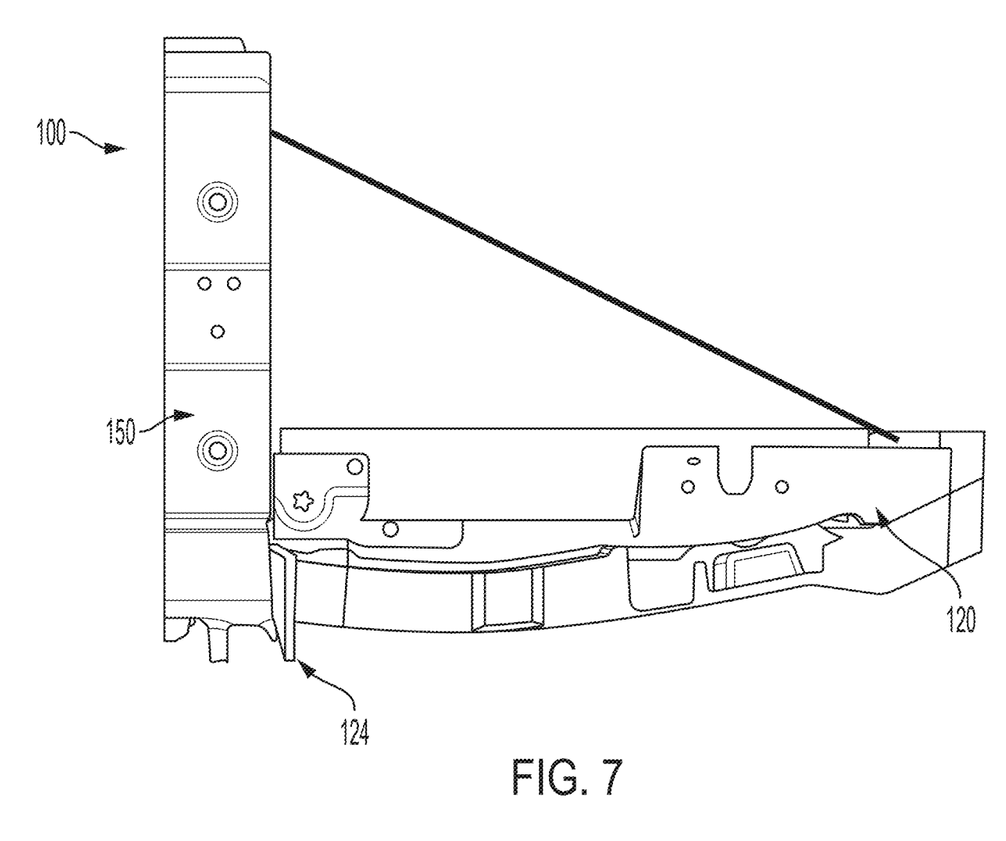
FIG. 7 depicts an example of a diagram representative of a pivot hinge and tailgate portion in a vertically (downward) opened position.

FIG. 7 depicts panel 120 of system 100 in a downward position pivoted downward from sidewall 150. Panel 120 may move through to the depicted downward open position via pivot hinge 124. In certain embodiments, such a pivot hinge may be detached from the sliding mechanism. Additionally, and/or alternatively, the left tailgate panel or the right tailgate panel may be detached from the pivot hinge and the sliding mechanism.

Disconnecting the left tailgate panel or the right tailgate panel may provide enhanced access to the truck bed by moving the left tailgate panel and the right tailgate panel away from the side of the vehicle. Further moving the left tailgate panel and the right tailgate panel away from the side of the vehicle may include unfolding the left tailgate panel and the right tailgate panel away from each other and away from the side of the vehicle.

The tailgate opening system may be enabled to detach the left tailgate panel or the right tailgate panel to the sliding mechanism and/or pivot hinge. To detach the left tailgate panel or the right tailgate panel, the linkage and/or pivot hinge may be disconnected from the sliding mechanism. The linkage and/or pivot hinge may be disconnected by removing a pin from an aperture at the linkage and/or pivot hinge. The disconnected panel may be unfolded from the panel connected to the second hinge (i.e., the left tailgate panel or the right tailgate panel). The disconnected panel and the panel connected to the second hinge may rotate about the second hinge out and away from the front and side of the truck. This results in greater access to the bed of the vehicle.

The tailgate opening system may be enabled to reattach the disconnected panel (i.e., the left tailgate panel or the right tailgate panel) to the sliding mechanism and/or pivot hinge. To reattach the disconnected tailgate panel, the first hinge may rotate the disconnected panel towards the panel connected to the second hinge. The disconnected panel and the panel connected to the second hinge may rotate about the second hinge towards the side of the truck to bring the disconnected panel in contact with the linkage and/or pivot hinge. To reattach the disconnected panel, the linkage and/or pivot hinge may be reconnected to the sliding mechanism. For example, the linkage and/or pivot hinge may be reconnected by inserting a pin into an aperture at the linkage and/or pivot hinge.

The technical advantages include sliding the tailgate panels to one side of the truck to enhance access to the truck bed. The tailgate may slide using a pivot hinge and linkages at the bottom of the tailgate. The pivot hinge may slide along a track running from one sidewall to the other sidewall. In comparison to single-panel tailgates that swing open, the folding panels may have a smaller footprint and may have a smaller range of motion. The folding panels accommodate limited spaces behind the truck for loading and unloading cargo.

Figure 8:
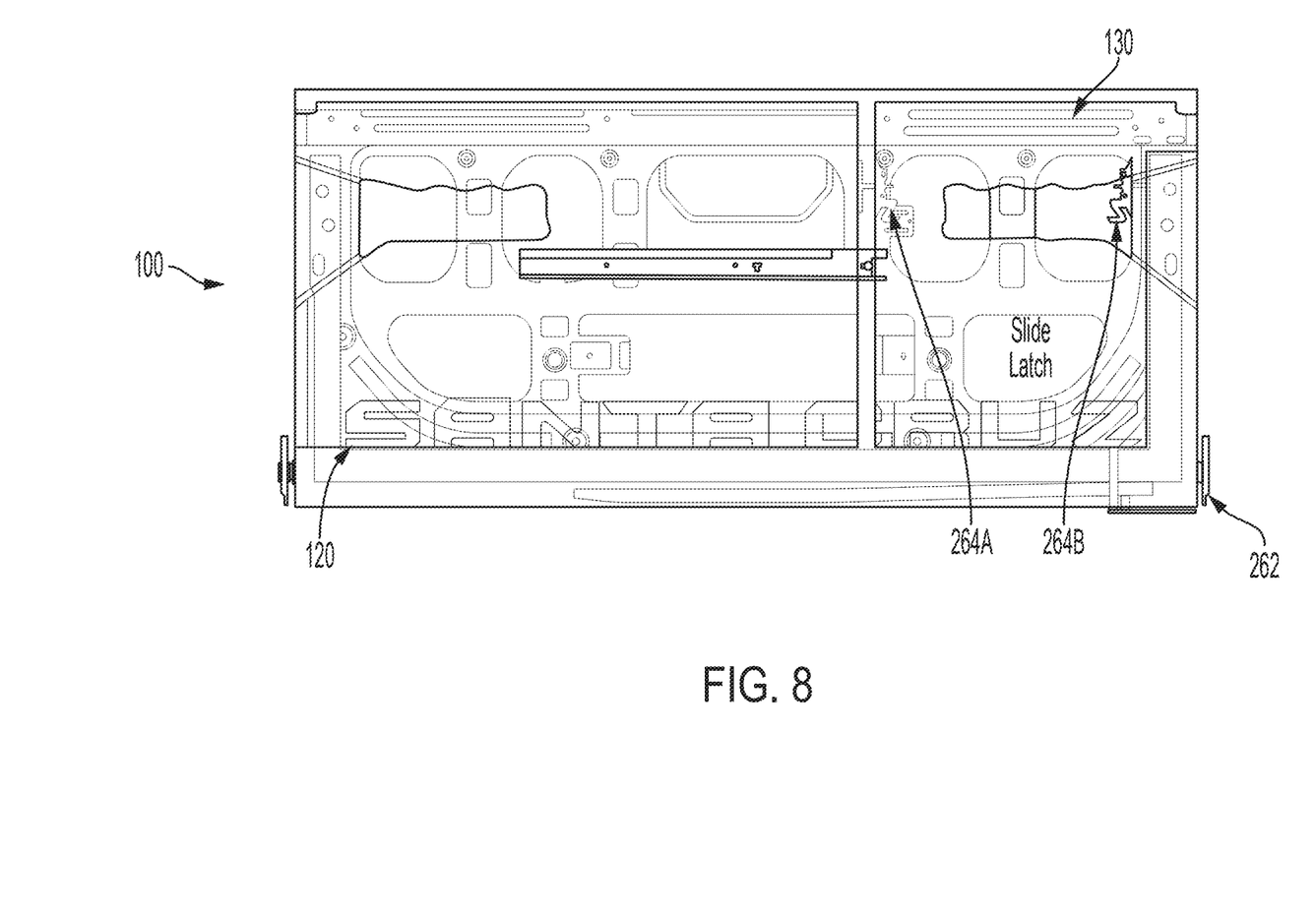
FIG. 8 depicts a preferred tailgate and opening system.

FIG. 8 depicts system 100 that includes pivoting member (e.g. hinge) 262 for downward or vertical opening of panel 130 and releasably engaging members (e.g. latches) 264A, 264B for sliding or lateral engagement and sliding opening of panel 130 toward and overlapping panel 120.

Figure 9:
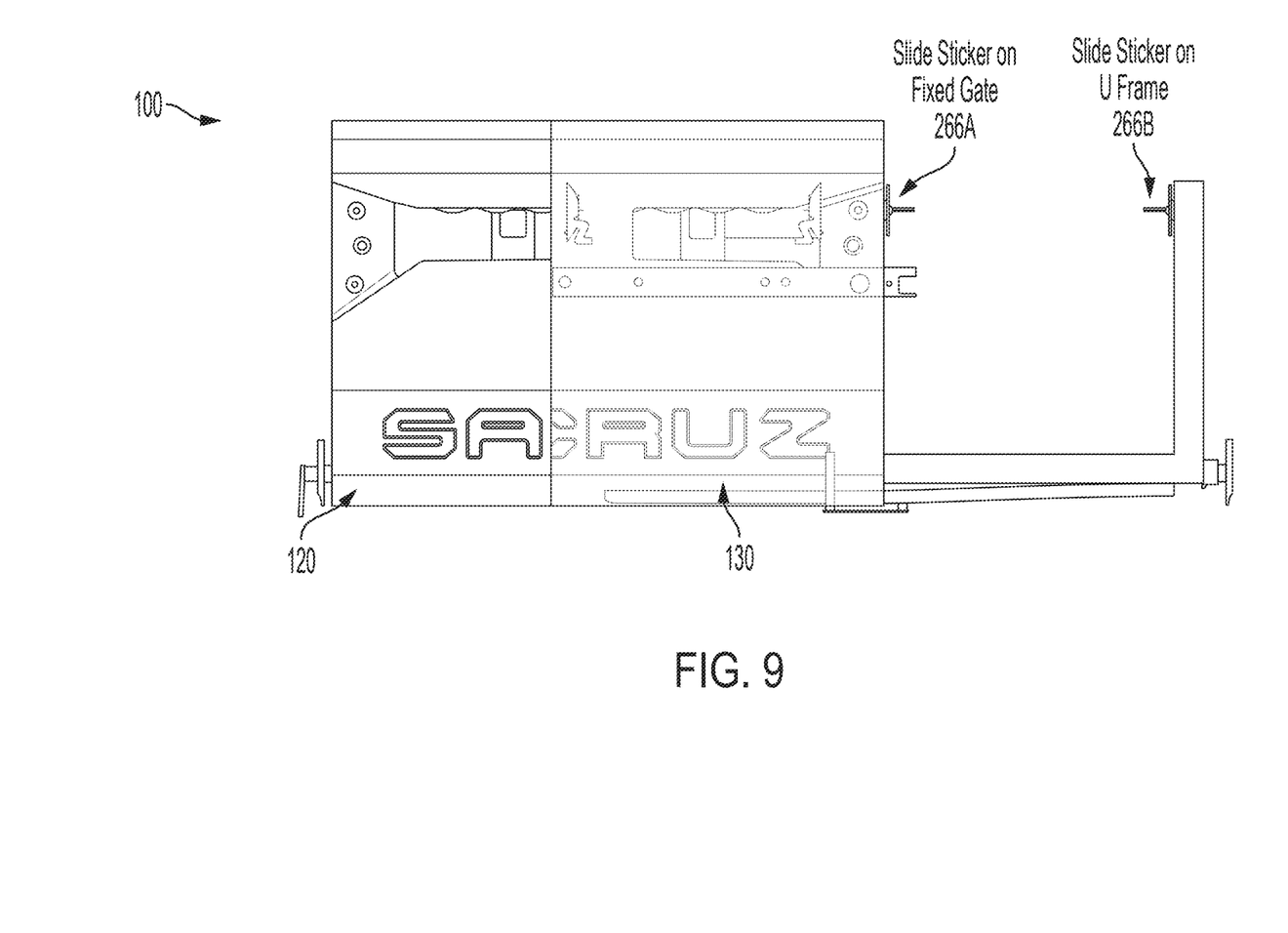
FIG. 9 depicts a tailgate opening systems and opening configurations and mechanisms.

FIG. 9 depicts system 100 that includes tailgate panel 130 is a lateral open position slidingly positioned in front of and at least partially overlapping adjacent panel 120. Engagement units 266A and 266B are depicted unengaged and will receive and engagement panel 130 when slidingly moved to a closed position in an adjacent and non-overlapping position with respect to panel 120. Such a closed position can be seen in FIG. 10A.

Figure 10A:
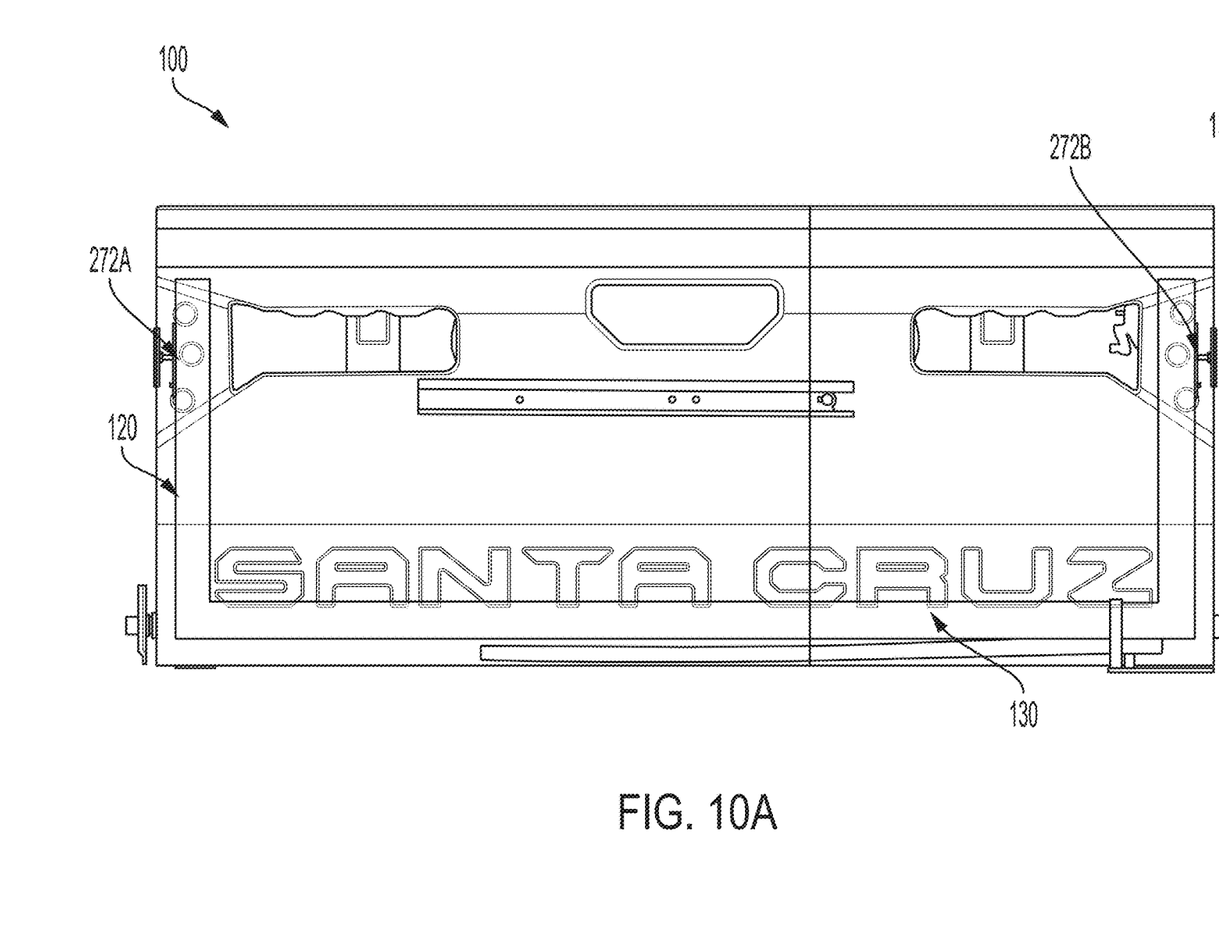
FIGS. 10A and 10B depict further tailgate opening systems and opening configurations and mechanisms.
Figure 10B:
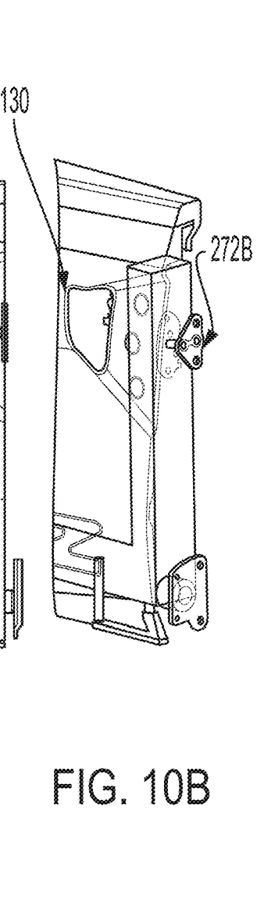

As can be seen at FIGS. 10A and 10B, a tailgate system 100 may include one or more engagement units 272A and 272B which can be activated (e.g. disengaged) when one or more tailgates panel are opened to a drop-down position or then activated (e.g. engaged) when the open or more panels are returned to a vertical closed position. In one embodiments, units 272A and 272B may be a latch/striker apparatus for disengaging ang engaging when opening and closing one or both of the tailgate panels 120, 130 as exemplified in FIG. 10B.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A tailgate opening system for a vehicle, the tailgate opening system comprising:
   a tailgate of the vehicle including a left tailgate panel and a right tailgate panel, the tailgate configured to fold down for accessing a bed of the vehicle;
   a first track extending along a bottom edge of the tailgate;
   a second track extending along the left tailgate panel,
   wherein the right tailgate panel is configured to slide across the first track and the second track to open the tailgate sideways for accessing the bed of the vehicle;
   wherein the right tailgate panel partially overlaps the left tailgate panel in response to sliding the right tailgate panel across the first track and the second track to open the tailgate sideways;
   a U-frame extending along the bottom edge of the tailgate and sides of the tailgate, the U-frame having a bottom portion, a first side portion and a second side portion;
   wherein the right tailgate panel comprises:
      a first slide latch configured to releasably attach to the second side portion of the U-frame; and
      a second slide latch configured to releasably attach to the left tailgate panel.

2. The tailgate opening system of claim 1, wherein the first track is configured to rotate with the tailgate as the tailgate is folded down.

3. The tailgate opening system of claim 1, wherein the second track is configured to extend along an outside surface of the left tailgate panel and wherein a top portion of the right tailgate panel extends above the second track.

4. The tailgate opening system of claim 1,
   wherein the first track extends along the bottom portion of the U-frame, and
   wherein the left tailgate panel is releasably attached to the first side portion of the U-frame.

5. The tailgate opening system of claim 4, wherein the first track is configured to rotate with the U-frame as the tailgate is folded down.

6. The tailgate opening system of claim 4, wherein the right tailgate panel further comprises:
   a slide handle configured to detach the right tailgate panel from the second side portion of the U-frame; and
   a cable that couples to the first slide latch and the slide handle, the cable configured to pull on the first slide latch to detach the right tailgate panel from the second side portion of the U-frame in response to activating the slide handle.

7. The tailgate opening system of claim 6, wherein the cable couples to the second slide latch and the slide handle, the cable configured to pull on the second slide latch to detach the left tailgate panel from the right tailgate panel in response to activating the slide handle.

8. The tailgate opening system of claim 1, wherein the right tailgate panel is coupled to the first track with a first link, and wherein the right tailgate panel is coupled to the second track with a second link.

9. The tailgate opening system of claim 1, wherein a first link end rolls along the first track and a second link end slides along the second track.

10. The tailgate opening system of claim 1, wherein the first track and the second track each include a bar with an aperture.

11. The tailgate opening system of claim 1, wherein the tailgate further comprises:
   a handle configured to releasably detach the right tailgate panel from a first vehicle sidewall latch and the left tailgate panel from a second vehicle sidewall latch for folding the tailgate down; and
   a cable extending between the handle and the first vehicle sidewall latch and the second vehicle sidewall latch, the cable extending along the U-frame of the tailgate between the handle and the first vehicle sidewall latch.

12. The tailgate opening system of claim 11, wherein:
   the first vehicle sidewall latch is located at the first side portion of the U-frame and is configured to latch the right tailgate panel to a first vehicle sidewall; and
   the second vehicle sidewall latch is located at the second side portion of the U-frame and is configured to latch the left tailgate panel to the U-frame.

13. A vehicle comprising the tailgate opening system of claim 1.

* * * * *